(12) United States Patent
Williams

(10) Patent No.: US 7,377,484 B1
(45) Date of Patent: May 27, 2008

(54) MULTI-FUNCTIONAL RATCHET AND ASSOCIATED METHOD

(76) Inventor: Marcus Williams, 209 Levee Dr., Mabank, TX (US) 75156

( * ) Notice: Subject to any disclaimer, the term of this patent is extended or adjusted under 35 U.S.C. 154(b) by 0 days.

(21) Appl. No.: 11/809,583

(22) Filed: Jun. 2, 2007

Related U.S. Application Data

(60) Provisional application No. 60/810,370, filed on Jun. 2, 2006.

(51) Int. Cl.
*B66D 1/00* (2006.01)
(52) U.S. Cl. ............... 254/218; 254/223; 24/68 R; 24/68 CD; 24/71 ST
(58) Field of Classification Search ............ 254/218, 254/223, 239; 24/68 R, 71 ST, 68 CD
See application file for complete search history.

(56) References Cited

U.S. PATENT DOCUMENTS

| | | | | |
|---|---|---|---|---|
| 4,912,813 A | * | 4/1990 | Muller et al. | 24/68 CD |
| 5,778,496 A | * | 7/1998 | Huang | 24/68 CD |
| 5,943,742 A | * | 8/1999 | Huang | 24/68 CD |
| 6,076,805 A | * | 6/2000 | Messersmith | 254/218 |
| 6,682,053 B1 | * | 1/2004 | Chou | 254/218 |
| 6,799,750 B2 | * | 10/2004 | Chen | 254/218 |
| 6,880,810 B1 | * | 4/2005 | Hu | 254/218 |

* cited by examiner

*Primary Examiner*—Emmanuel M Marcelo

(57) ABSTRACT

A multi-functional ratchet includes first and second bars with left and right axially opposed ends respectively. Each bar is provided with a channel formed therein with a longitudinal length that is less than the longitudinal length of the bar. The apparatus further includes first and second beams with axially opposed proximal and distal ends. The beams are pivotally attached to the bars. Each beam is provided with a channel formed therein with a longitudinal length that is less than a longitudinal length of the beam. A mechanism winds a strap about a central portion of the ratchet when the first and second beams are laterally displaced away from equilibrium. The winding mechanism is connected to the bars and the beams respectively. The strap is freely rotated about the central portion while the first and second beams are maintained at a static position.

18 Claims, 5 Drawing Sheets

MULTI-FUNCTIONAL RATCHET AND ASSOCIATED METHOD

CROSS REFERENCE TO RELATED APPLICATIONS

This application claims the benefit of U.S. Provisional Application No. 60/810,370, filed Jun. 2, 2006, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to ratcheting apparatuses and, more particularly, to a multi-functional ratchet and associated method for assisting a user to quickly and easily wind an existing strap housed by said multi-functional ratchet.

2. Prior Art

Due to high moving costs many Americans choose to move home furnishing themselves, by employing pickup trucks, flatbed trucks, etc. The mover loads the belongings onto the truck and then secures the belongings thereto so the objects do not move or fall out of the truck and be damaged. Most of these belongings are secured using lengths of cord or commercially available ratchet and strap systems. Cords can fray and separate, and are also hard to tightly secure and tie down adequately. Ratchet and strap systems can be frustrating to use and often become tangled and useless.

One prior art example shows a two-arm tensioning device that is used to tighten and to lock load-fastening belts. The arms are pivotally mounted about a reel drum on which are mounted toothed discs which turn with the drum. Upon pivoting of the first arm the belt is wound onto the reel drum by the engagement of a first catch on the first arm with the teeth of the discs. A second catch on the second arm is provided to prevent, through its engagement with the disc teeth, turning movement of the drum in the opposite direction. The second arm includes a locking member arranged to releasably engage the first catch to prevent unintentional pivoting of the first arm after tightening of the belt. A special safety catch in the form of a projection is provided on the first arm to releasably retain the second catch in engagement with the disc teeth. Unfortunately this prior art example does not provide a means for a user to wind the length of strap onto the spindle for storage and transport purposes.

Another prior art example shows a ratchet strap tightener that is manufactured by a plastic injection molding process and includes a body, a lever and a ratchet device. The body has two parallel strap holders adapted to hold one end of a strap. The lever is pivotally attached to the body with the ratchet device to allow a strap shaft to rotate toward the lever when the lever is pivoted away from the body. A strap slot is defined in the axle and is adapted to hold the other end of the strap. The strap is rolled on the axle to tighten the strap which binds around an object when the lever is pivoted continuously. Unfortunately this prior art example does not allow a user to wind a longer-than-normal length of strap around the spindle during non-operating conditions.

Accordingly, a need remains for a multi-functional ratchet and associated method in order to overcome the above-noted shortcomings. The present invention satisfies such a need by providing an apparatus that is convenient and easy to use, is lightweight yet durable in design, and assists a user to quickly and easily wind an existing strap housed by said multi-functional ratchet. Such an apparatus allows the user to easily wind the strap around the spindle during non-operating conditions without tangling the strap. The apparatus saves time, and also allows the user to employ a longer-than-normal strap during operating conditions. The present invention is simple to use, inexpensive, and designed for many years of repeated use.

BRIEF SUMMARY OF THE INVENTION

In view of the foregoing background, it is therefore an object of the present invention to provide an apparatus for a multi-functional ratchet and associated method. These and other objects, features, and advantages of the invention are provided by a multi-functional ratchet for assisting a user to quickly and easily wind an existing strap housed by said multi-functional ratchet.

The apparatus includes first and second coextensively shaped rectilinear bars with left and right axially opposed ends respectively. Each of such bars is conveniently provided with a rectilinear channel effectively formed therein with a respective longitudinal length that is less than a respective longitudinal length of the bar. A cylindrical post is directly attached to respective inner surfaces of each of the left ends of the first and second bars such that the left ends of the first and second bars are advantageously spaced from each other. Such a post has a longitudinal length registered perpendicular to the longitudinal lengths of the first and second bars.

The apparatus further includes first and second coextensively shaped rectilinear beams with axially opposed proximal and distal ends respectively. Each of such distal ends of the beams is pivotally attached directly to an associated one of the right ends of the bars. Each of such beams is conveniently provided with a rectilinear channel formed therein with a respective longitudinal length that is less than a respective longitudinal length of the beam. A cylindrical shaft is directly attached to respective inner surfaces of each of the proximal ends of the first and second beams such that the proximal ends of the first and second beams are advantageously spaced from each other. Such a shaft has a longitudinal length registered perpendicular to the longitudinal lengths of the first and second beams, and that is greater than the longitudinal length of the post. The right ends of the first and second bars and the distal ends of the first and second beams have openings effectively formed therein respectively. Such respective openings have equal sized diameters and centrally registered axes oriented perpendicularly to respective longitudinal lengths of the first and second bars and the first and second beams.

The apparatus further includes a mechanism for conveniently winding the existing strap about a central portion of the ratchet when the first and second beams are laterally displaced away from equilibrium. Such a winding mechanism is rotatably connected to the right ends of the first and second bars and the distal ends of the first and second beams respectively. The existing strap is freely rotated about the central portion while the first and second beams are effectively maintained at a static position.

The winding mechanism includes a centrally disposed spindle connected between the right ends of the first and second bars and the distal ends of the first and second beams respectively. Such a spindle has axially opposed ends simultaneously penetrating through the openings of the first and second bars and the first and second beams respectively. Such opposed ends of the spindle effectively extend beyond respective outer surfaces of the first and second bars and the first and second beams when the spindle is connected between the right ends of the first and second bars and the distal ends of the first and second beams. The spindle has a slot monolithically formed therein and advantageously extending along a major longitudinal length thereof such that the spindle is bifurcated into two coextensively shaped halves along the longitudinal length thereof. Such a slot effectively terminates proximal of the respective opposed ends of the spindle. The spindle is freely rotatable about a centrally registered axis thereof during operating conditions while the first and second beams remain stationary.

The winding mechanism further includes a rectilinear handle that has a distal end pivotally attached directly to a selected one of the opposed ends of the spindle. Such a handle is conveniently located adjacent to the outer surface of the distal end of the first and second beams and further has a proximal end advantageously extending away from the distal end of the handle and the selected opposed end during winding procedures. The handle has a longitudinal length registered parallel to the longitudinal lengths of the first and second beams during winding procedures, and the handle and the spindle rotate in sync during winding procedures.

The winding mechanism further includes first and second planar levers. Each of such first and second levers is substantially U-shaped and further has closed proximal ends and open distal ends respectively. Each of such open ends of the first and second levers has laterally opposed outside edges slidably interfitted within the channels of the first and second bars and the first and second beams respectively and further extending outwardly and away from the outer surfaces of the first and second bars and the first and second beams respectively.

The winding mechanism further includes first and second rectilinear rods. Such a first rod is conveniently provided with axially opposed ends integrally attached to the respective inner surfaces of the first and second bars, and has a longitudinal length registered parallel to the post. The first rod is effectively spaced from the left ends of the first and second bars and the post respectively, and the longitudinal length of the first rod is equal to the longitudinal length of the post. Such a second rod is conveniently provided with axially opposed ends integrally attached to the respective inner surfaces of the first and second beams, and has a longitudinal length registered parallel to the shaft. The second rod is effectively spaced from the proximal ends of the first and second beams and the shaft respectively, and the longitudinal length of the second rod is equal to the longitudinal length of the shaft.

The winding mechanism further includes a plurality of manually adjustable spring-loaded locking pins conveniently provided with first and second axially opposed ends. Each of such first ends of the locking pins is directly attached to a medial portion of each of the proximal ends of the first and second levers respectively. Each of the first and second locking pins has a longitudinal length oriented parallel to the longitudinal lengths of the first and second bars and the first and second beams respectively. Each of such second ends of the locking pins is directly attached to a medial portion of the first and second rods respectively.

The first and second locking pins are independently and simultaneously compressed and extended along linear paths effectively defined by the longitudinal lengths thereof respectively such that the first and second levers are slidably positioned along respective linear paths effectively defined by the channels of the first and second bars and the first and second beams respectively. The compressed position of the locking pins corresponds to an equilibrium state of the first and second levers respectively while the extended position of the first and second locking pins corresponds to a tensed state respectively.

The apparatus further includes a mechanism for securing cargo within an existing vehicle. Such a securing mechanism includes a primary strap conveniently provided with axially opposed first and second ends and a lateral width equal to the longitudinal length of the slot of the spindle. Such a first end of the primary strap is removably penetrated into the slot of the spindle during operating conditions. The first end of the primary strap is effectively wrapped around an outer surface of the spindle and statically affixed thereto. The primary strap has a hook directly attached to the second end thereof, and the primary strap is wound about the spindle along a major longitudinal length thereof via the handle during winding procedures.

The apparatus further includes a secondary strap provided with axially opposed proximal and distal ends. Such a proximal end of the secondary strap is directly attached to the post, and the secondary strap has a hook directly attached to the distal end thereof. The secondary strap has a lateral width equal to the lateral width of the primary strap.

The apparatus further includes a plurality of gear wheels directly attached to the opposed ends of the spindle. Each of such gear wheels is advantageously intercalated between the right ends of the bars and the distal ends of the beams respectively, and each of the gear wheels has a saw-tooth pattern of teeth monolithically formed about a circumference thereof.

Selected ones of the teeth of the gear wheels are simultaneously and independently engaged by the open ends of the first and second levers respectively when the respective first and second locking pins are in the extended position such that the spindle is effectively rotated about the longitudinal axis thereof when the distal ends of the first and second beams are manually articulated about the longitudinal axis of the spindle thereby tightening the primary and secondary straps respectively about the cargo being secured during tightening procedures. The first and second beams are alternatively articulated along a first uni-directional path and a second opposite uni-directional path respectively during tightening and loosening procedures respectively.

A method of winding an existing strap housed by a multi-functional ratchet includes the steps of providing first and second pairs of coextensively shaped rectilinear bars. Each of the bars has left and right axially opposed ends respectively, and each of the bars is provided with a rectilinear channel formed therein. The channels have respective longitudinal lengths that are less than respective longitudinal lengths of the bars. The steps further include providing first and second coextensively shaped rectilinear beams. Each of the beams has axially opposed proximal and distal ends respectively, and each of the distal ends of the beams is pivotally attached directly to an associated one of the right ends of the bars. Each of the beams is provided with a rectilinear channel formed therein. The channels have respective longitudinal lengths that are less than respective longitudinal lengths of the beams.

The method of winding an existing strap further includes the steps of winding the existing strap about a central portion of the ratchet when the first and second beams are laterally displaced away from equilibrium. The existing strap is freely rotated about the central portion while the first and second beams are maintained at a static position.

The method of winding an existing strap further includes the steps of directly attaching a cylindrical post to respective inner surfaces of each of the left ends of the first and second bars such that the left ends of the first and second bars are spaced from each other. The post has a longitudinal length registered perpendicular to the longitudinal lengths of the first and second bars.

The method of winding an existing strap further includes the steps of directly attaching a cylindrical shaft to respective inner surfaces of each of the proximal ends of the first and second beams such that the proximal ends of the first and second beams are spaced from each other. The shaft has a longitudinal length registered perpendicular to the longitudinal lengths of the first and second beams, and the longitudinal length of the shaft is greater than the longitudinal length of the post.

The method of winding the strap about the central portion of the ratchet includes the steps of connecting a centrally disposed spindle between the right ends of the first and second bars and the distal ends of the first and second beams respectively. The spindle has axially opposed ends simultaneously penetrating through the openings of the first and second bars and the first and second beams respectively. The opposed ends of the spindle extend beyond respective outer surfaces of the first and second bars and the first and second beams when the spindle is connected between the right ends of the first and second bars and the distal ends of the first and second beams. The spindle has a slot monolithically formed therein and extending along a major longitudinal length thereof such that the spindle is bifurcated into two coextensively shaped halves along the longitudinal length thereof. The slot terminates proximal of the respective opposed ends of the spindle. The spindle is freely rotatable about a centrally registered axis thereof during operating conditions while the first and second beams remain stationary.

The method of winding the strap about the central portion of the ratchet further includes the steps of pivotally attaching a distal end of a rectilinear handle directly to a selected one of the opposed ends of the spindle. The handle is located adjacent to the outer surface of the distal end of the first and second beams and further has a proximal end extending away from the distal end of the handle and the selected opposed end during winding procedures. The handle has a longitudinal length registered parallel to the longitudinal lengths of the first and second beams during winding procedures, and the handle and the spindle rotate in sync during winding procedures.

The method of winding the strap about the central portion of the ratchet further includes the steps of slidably interfitting first and second planar levers within the channels and the first and second beams respectively. The first and second levers extend outwardly and away from the outer surfaces of the first and second bars and the first and second beams respectively. Each of the first and second levers is substantially U-shaped and further has closed proximal ends and open distal ends respectively.

The method of winding the strap about the central portion of the ratchet further includes the steps of providing first and second rectilinear rods. The first rod is provided with axially opposed ends integrally attached to the respective inner surfaces of the first and second bars. The first rod has a longitudinal length registered parallel to the post, and is spaced from the left ends of the first and second bars and the post respectively. The longitudinal length of the first rod is equal to the longitudinal length of the post. The second rod is provided with axially opposed ends integrally attached to the respective inner surfaces of the first and second beams, and the second rod has a longitudinal length registered parallel to the shaft. The second rod is spaced from the proximal ends of the first and second beams and the shaft respectively, and the longitudinal length of the second rod is equal to the longitudinal length of the shaft.

The method of winding the strap about the central portion of the ratchet further includes the steps of providing a plurality of manually adjustable spring-loaded locking pins that have first and second axially opposed ends. Each of the first ends of the locking pins is directly attached to a medial portion of each of the proximal ends of the first and second levers respectively. Each of the first and second locking pins has a longitudinal length oriented parallel to the longitudinal lengths of the first and second bars and the first and second beams respectively. Each of the second ends of the locking pins is directly attached to a medial portion of the first and second rods respectively.

The method of winding the strap about the central portion of the ratchet further includes the steps of independently and simultaneously compressing and extending the first and second locking pins along linear paths defined by the longitudinal lengths thereof respectively such that the first and second levers are slidably positioned along respective linear paths defined by the channels of the first and second bars and the first and second beams respectively. The compressed position of the locking pins corresponds to an equilibrium state of the first and second levers respectively while the extended position of the first and second locking pins corresponds to a tensed state respectively.

The method of winding an existing strap further includes the steps of securing cargo within an existing vehicle by providing a primary strap provided with axially opposed first and second ends. The primary strap has a lateral width equal to the longitudinal length of the slot of the spindle, and the first end of the primary strap is removably penetrated into the slot of the spindle during operating conditions. The first end of the primary strap is wrapped around an outer surface of the spindle and statically affixed thereto. The primary strap has a hook directly attached to the second end thereof, and the primary strap is wound about the spindle along a major longitudinal length thereof via the handle during securing procedures.

The method of winding an existing strap further includes the steps of providing a secondary strap provided with axially opposed proximal and distal ends. The proximal end of the secondary strap is directly attached to the post, and the secondary strap has a hook directly attached to the distal end thereof. The secondary strap has a lateral width equal to the lateral width of the primary strap. The steps further include directly attaching a plurality of gear wheels to the opposed ends of the spindle. Each of the gear wheels is intercalated between the right ends of the bars and the distal ends of the beams respectively, and each of the gear wheels has a saw-tooth pattern of teeth monolithically formed about a circumference thereof.

The method of winding an existing strap further includes the steps of simultaneously and independently engaging selected ones of the teeth of the gear wheels by the open ends of the first and second levers respectively when the respective first and second locking pins are in the extended position such that the spindle is rotated about the longitudinal axis thereof when the distal ends of the first and second beams are manually articulated about the longitudinal axis of the spindle thereby tightening the primary and secondary straps respectively about the cargo is secured during tightening procedures.

The method of winding an existing strap further includes the steps of alternatively articulating the first and second beams along a first uni-directional path and a second opposite uni-directional path respectively during tightening and loosening procedures respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
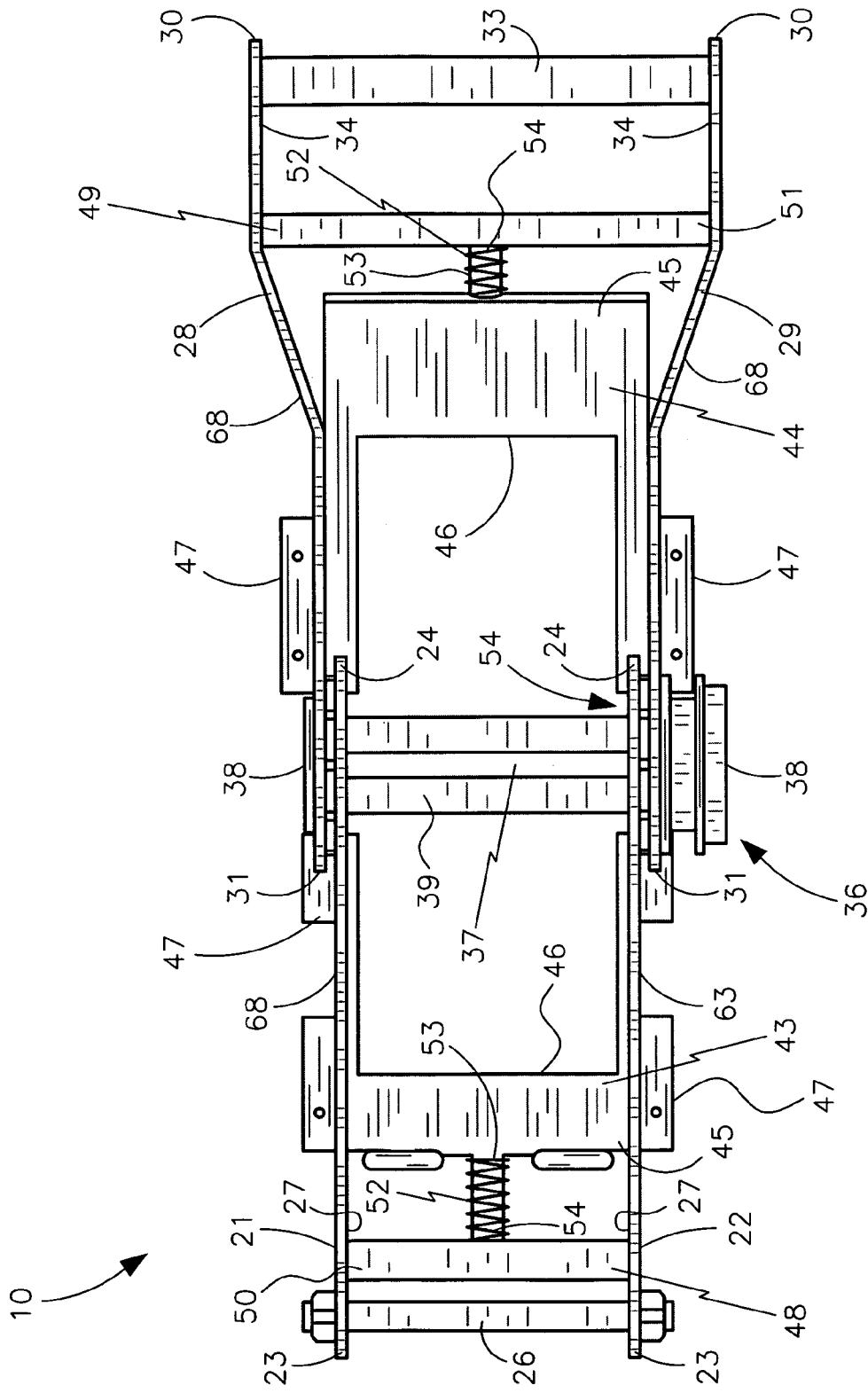
FIG. 1 is a top plan view of the apparatus showing the locking pins in the extended position, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-5 by the reference numeral 10 and is intended to provide a multi-functional ratchet and associated method. It should be understood that the apparatus 10 may be used to secure many different types of cargo in many different types of environments and should not be limited in use to securing only those types of cargo in those types of environments described herein.

Referring initially to FIGS. 1, 2, 3, 4 and 5, the apparatus 10 includes first 21 and second 22 coextensively shaped rectilinear bars with left 23 and right 24 axially opposed ends respectively. Each of such bars 21, 22 is provided with a rectilinear channel 25 formed therein with a respective longitudinal length that is less than a respective longitudinal length of the bar 21, 22. A cylindrical post 26 is directly attached to respective inner surfaces 27 of each of the left ends 23 of the first and second bars 21, 22, without the use of intervening elements, which is essential such that the left ends 23 of the first and second bars 21, 22 are spaced from each other. Such a spacing allows the primary strap 55 and secondary strap 59 respectively (both herein described below) to be wound and unwound smoothly and easily. Such a post 26 has a longitudinal length registered perpendicular to the longitudinal lengths of the first and second bars 21, 22.

Again referring to FIGS. 1 through 5, the apparatus 10 further includes first 28 and second 29 coextensively shaped rectilinear beams with axially opposed proximal 30 and distal 31 ends respectively. Each of such distal ends 31 of the beams 28, 29 is pivotally attached directly to an associated one of the right ends 24 of the bars 21, 22, without the use of intervening elements. Such a connection allows the distal ends 31 of the beams 28, 29 to freely rotate about the right ends 24 of the bars 21, 22 during operating conditions. Each of such beams 28, 29 is provided with a rectilinear channel 32 formed therein with a respective longitudinal length that is less than a respective longitudinal length of the beam 28, 29.

Figure 2:
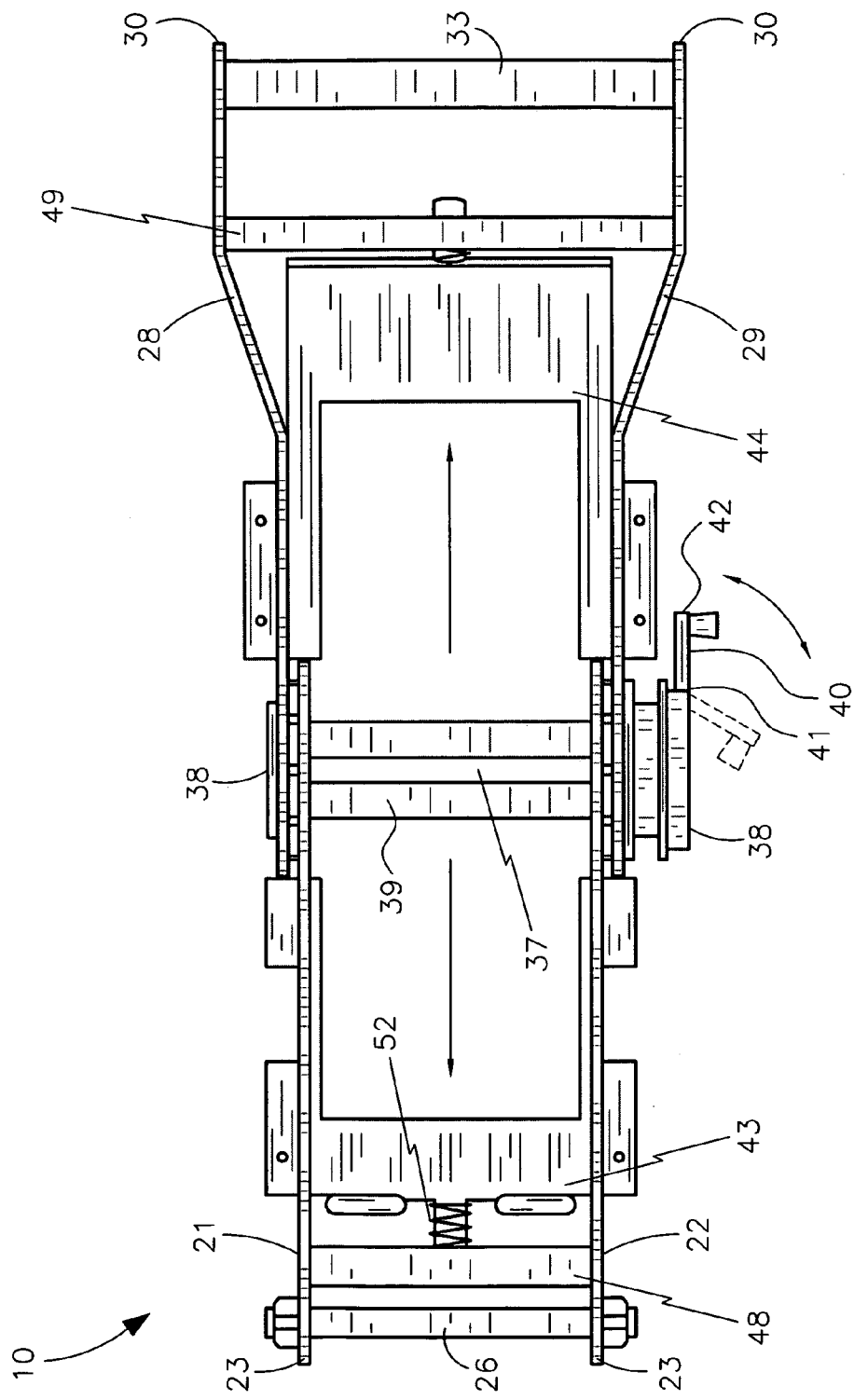
FIG. 2 is a top plan view of the apparatus shown in FIG. 1, showing the locking pins in the compressed position and the handle in the extended position respectively.

Referring to FIGS. 1 and 2, a cylindrical shaft 33 is directly attached to respective inner surfaces 34 of each of the proximal ends 30 of the first and second beams 28, 29, without the use of intervening elements, which is critical such that the proximal ends 30 of the first and second beams 28, 29 are spaced from each other. Such a shaft 33 has a longitudinal length registered perpendicular to the longitudinal lengths of the first and second beams 28, 29, and that is greater than the longitudinal length of the post 26. Such a length of the shaft 33 provides a sufficient gripping surface for the user to easily articulate the first and second beams 28, 29 respectively during operating conditions. The right ends 24 of the first and second bars 21, 22 and the distal ends 31 of the first and second beams 28, 29 have openings 35 formed therein respectively. Such respective openings 35 have equal sized diameters and centrally registered axes oriented perpendicularly to respective longitudinal lengths of the first and second bars 21, 22 and the first and second beams 28, 29.

Yet again referring to FIGS. 1 through 5, the apparatus 10 further includes a mechanism 36 for winding the existing strap about a central portion of the ratchet 10 when the first and second beams 28, 29 are laterally displaced away from equilibrium. Such a winding mechanism 36 is rotatably connected to the right ends 24 of the first and second bars 21, 22 and the distal ends 31 of the first and second beams 28, 29 respectively. The existing strap is freely rotated about the central portion while the first and second beams 28, 29 are maintained at a static position. This allows the user to wind the existing strap without operating the securing mechanism 54 (herein described below).

Again referring to FIGS. 1 and 2, the winding mechanism 36 includes a centrally disposed spindle 37 connected between the right ends 24 of the first and second bars 21, 22 and the distal ends 31 of the first and second beams 28, 29 respectively. Such a spindle 37 has axially opposed ends 38 simultaneously penetrating through the openings 35 of the first and second bars 21, 22 and the first and second beams 28, 29 respectively. Such opposed ends 38 of the spindle 37 extend beyond respective outer surfaces 68 of the first and second bars 21, 22 and the first and second beams 28, 29 when the spindle 37 is connected between the right ends 24 of the first and second bars 21, 22 and the distal ends 31 of the first and second beams 28, 29. The spindle 37 has a slot 39 monolithically formed therein and extending along a major longitudinal length thereof, which is crucial such that the spindle 37 is bifurcated into two coextensively shaped halves along the longitudinal length thereof. Such a slot 39 terminates proximal of the respective opposed ends 38 of the spindle 37. The spindle 37 is freely rotatable about a centrally registered axis thereof during operating conditions while the first and second beams 28, 29 remain stationary. This allows the user to effectively wind the existing strap around the spindle 37 for storage and transport purposes.

Figure 4:
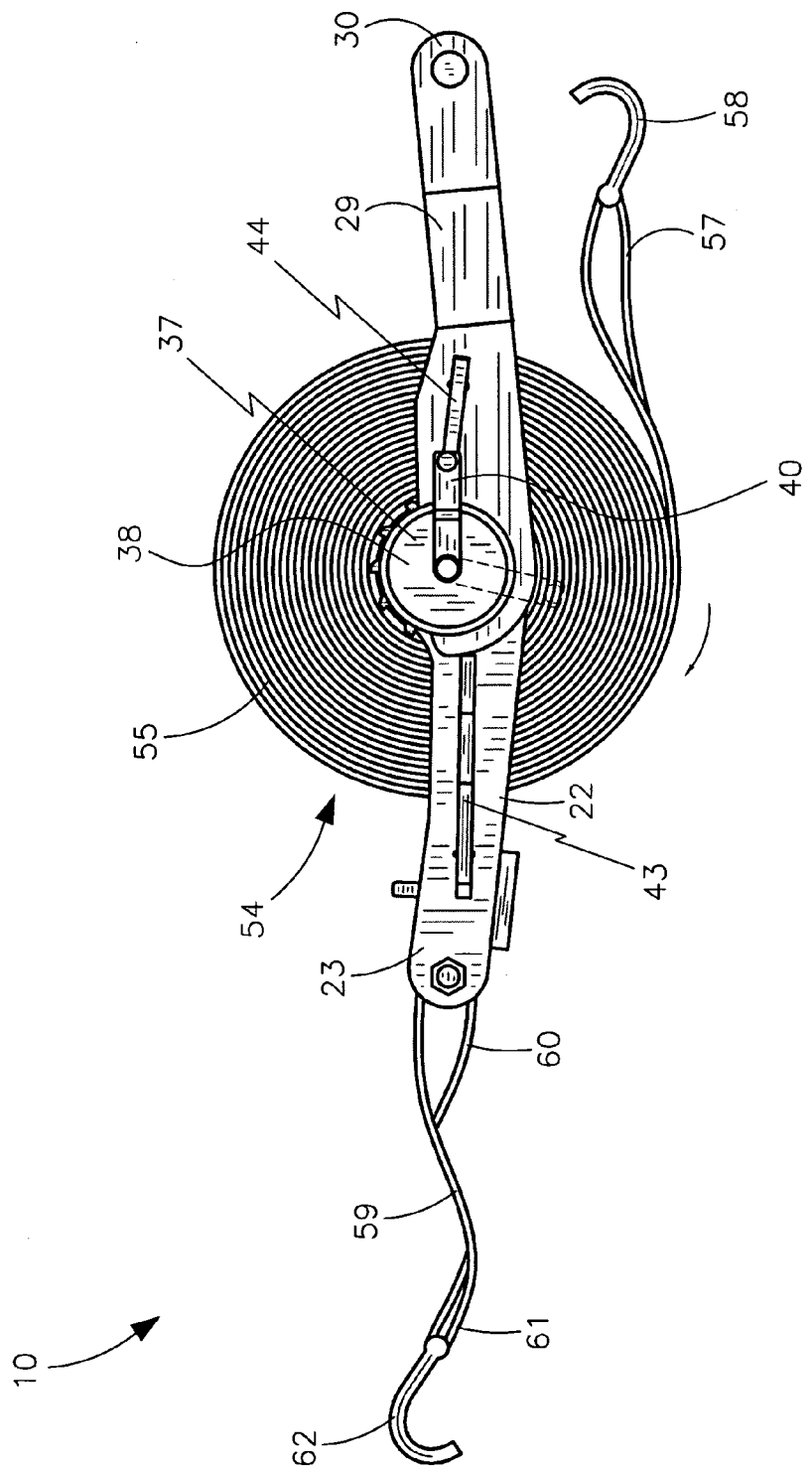
FIG. 4 is a side elevational view of the apparatus showing the primary and secondary straps respectively attached to the apparatus.

Referring to FIGS. 2 and 4, the winding mechanism 36 further includes a rectilinear handle 40 that has a distal end 41 pivotally attached directly to a selected one of the opposed ends 38 of the spindle 37, without the use of intervening elements. The pivotal connection allows the user to position the handle 40 in such a manner that the handle 40 does not interfere with the securing mechanism 54 during operating conditions. Such a handle 40 is located adjacent to the outer surfaces 68 of the distal ends 31 of the first and second beams 28, 29 and further has a proximal end 42 extending away from the distal end 41 of the handle 40 and the selected opposed end 38 during winding procedures. The handle 40 has a longitudinal length registered parallel to the longitudinal lengths of the first and second beams 28, 29 during winding procedures, and the handle 40 and the spindle 37 rotate in sync during winding procedures. Such synchronous rotation allows the user to exert a minimum of effort to wind the existing strap around the spindle 37.

Still referring to FIGS. 1 through 5, the winding mechanism 36 further includes first 43 and second 44 planar levers. Each of such first and second levers 43, 44 is substantially U-shaped and further has closed proximal ends 45 and open distal ends 46 respectively. Each of such open ends 46 of the first and second levers 43, 44 has laterally opposed outside edges 47 slidably interfitted within the channels 25, 32 of the first and second bars 21, 22 and the first and second beams 28, 29 respectively and further extending outwardly and away from the outer surfaces 68 of the first and second bars 21, 22 and the first and second beams 28, 29 respectively. The first and second levers 43, 44 respectively allow the user to wind the entire length of the existing strap within the open ends 46 of the first and second levers 43, 44 respectively during winding procedures, thereby allowing the user to employ straps of varying lengths for securing purposes.

Yet again referring to FIGS. 1 and 2, the winding mechanism 36 further includes first 48 and second 49 rectilinear rods. Such a first rod 48 is provided with axially opposed ends 50 integrally attached to the respective inner surfaces 27 of the first and second bars 21, 22, and has a longitudinal length registered parallel to the post 26. The first rod 48 is spaced from the left ends 23 of the first and second bars 21, 22 and the post 26 respectively, and the longitudinal length of the first rod 48 is equal to the longitudinal length of the post 26. Such a second rod 49 is provided with axially opposed ends 51 integrally attached to the respective inner surfaces 34 of the first and second beams 28, 29, and has a longitudinal length registered parallel to the shaft 33. The second rod 49 is spaced from the proximal ends 30 of the first and second beams 28, 29 and the shaft 33 respectively, and the longitudinal length of the second rod 49 is equal to the longitudinal length of the shaft 33. Such first and second rods 48, 49 provide suitable anchoring points for the spring-loaded locking pins 52 (herein described below).

Still referring to FIGS. 1 and 2, the winding mechanism 36 further includes a plurality of manually adjustable spring-loaded locking pins 52 provided with first 53 and second 54 axially opposed ends. Each of such first ends 53 of the locking pins 52 is directly attached to a medial portion of each of the proximal ends 45 of the first and second levers 43, 44 respectively, without the use of intervening elements. Each of the first and second locking pins 52 has a longitudinal length oriented parallel to the longitudinal lengths of the first and second bars 21, 22 and the first and second beams 28, 29 respectively. Each of such second ends 54 of the locking pins 52 is directly attached to a medial portion of the first and second rods 48, 49 respectively, without the use of intervening elements.

Still referring to FIGS. 1 and 2, the first and second locking pins 52 are independently and simultaneously compressed and extended along linear paths defined by the longitudinal lengths thereof respectively, which is important such that the first and second levers 43, 44 are slidably positioned along respective linear paths defined by the channels 25, 32 of the first and second bars 21, 22 and the first and second beams 28, 29 respectively. The compressed position of the locking pins 52 corresponds to an equilibrium state of the first and second levers 43, 44 respectively while the extended position of the first and second locking pins 52 corresponds to a tensed state respectively. The locking pins 52 allow the user to lock the levers 43, 44 in the desired position such that the user can then wind the entire length of the existing strap around the spindle 37 during non-operating conditions.

Referring to FIG. 4, the apparatus 10 further includes a mechanism 54 for securing cargo within an existing vehicle. Such a securing mechanism 54 includes a primary strap 55 provided with axially opposed first and second 57 ends, and a lateral width equal to the longitudinal length of the slot 39 of the spindle 37. Such a first end of the primary strap 55 is removably penetrated into the slot 39 of the spindle 37 during operating conditions. The first end of the primary strap 55 is wrapped around an outer surface of the spindle 37 and statically affixed thereto. Such positioning of the primary strap 55 within the slot 39 assures the first end of the primary strap 55 does not prematurely and undesirably exit the slot 39 during securing procedures. The primary strap 55 has a hook 58 directly attached to the second end 57 thereof, without the use of intervening elements, and the primary strap 55 is wound about the spindle 37 along a major longitudinal length thereof via the handle 40 during winding procedures.

Again referring to FIG. 4, the apparatus 10 further includes a secondary strap 59 provided with axially opposed proximal 60 and distal 61 ends. Such a proximal end 60 of the secondary strap 59 is directly attached to the post 26, without the use of intervening elements, and the secondary strap 59 has a hook 62 directly attached to the distal end 61 thereof, without the use of intervening elements. The secondary strap 59 has a lateral width equal to the lateral width of the primary strap 55. The primary strap 55 and the secondary strap 59 respectively cooperate to encircle a cargo and thereby prevent the cargo from undesirably shifting position during operating conditions.

Figure 3:
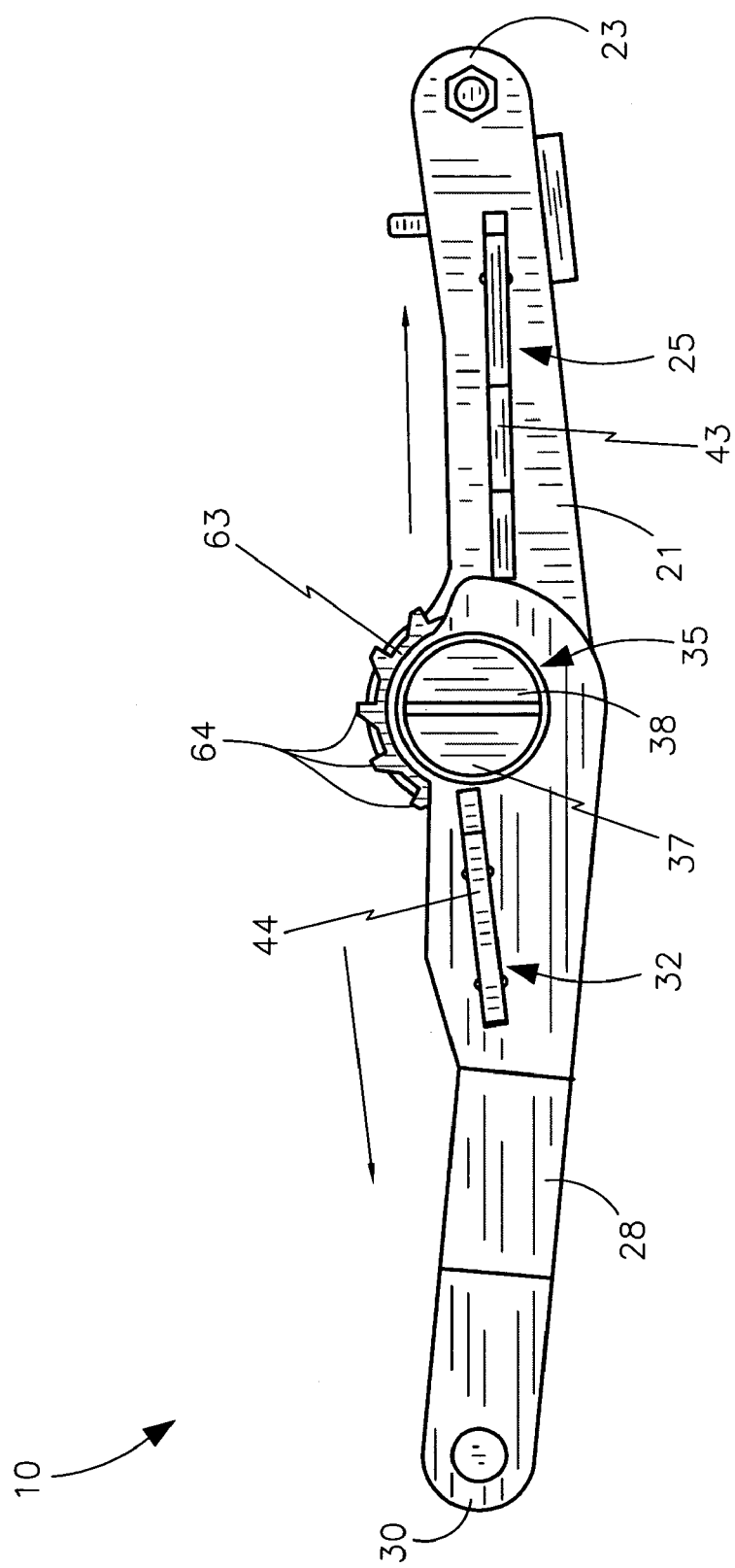
FIG. 3 is a side elevational view of the apparatus.
Figure 5:
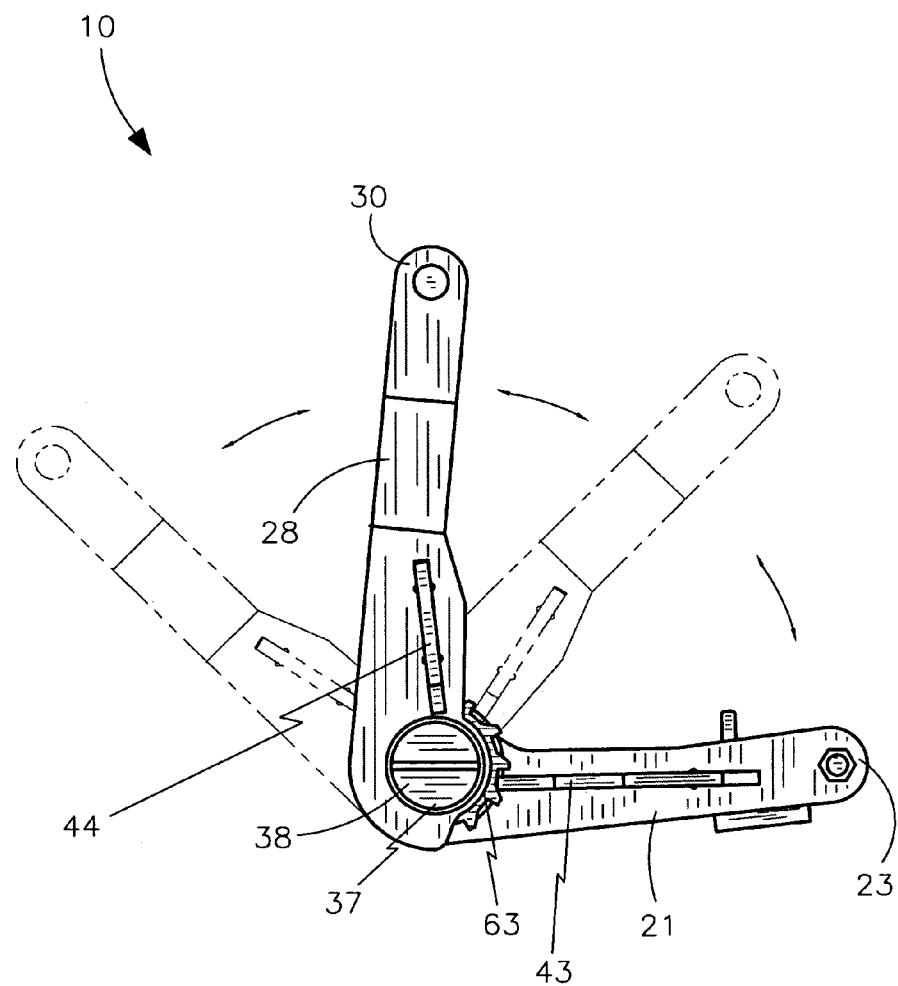
FIG. 5 is a side elevational view of the apparatus showing the first and second beams respectively being articulated about the spindle.

Referring to FIGS. 3, 4 and 5, the apparatus 10 further includes a plurality of gear wheels 63 directly attached to the opposed ends 38 of the spindle 37, without the use of intervening elements. Each of such gear wheels 63 is intercalated between the right ends 24 of the bars 21, 22 and the distal ends 31 of the beams 28, 29 respectively, and each of the gear wheels 63 has a saw-tooth pattern of teeth 64 monolithically formed about a circumference thereof. Each of the gear wheels 63 and the spindle 37 respectively rotate in sync during operating conditions.

Again referring to FIGS. 3 through 5, selected ones of the teeth 64 of the gear wheels 63 are simultaneously and independently engaged by the open ends 46 of the first and second levers 43, 44 respectively when the respective first and second locking pins 52 are in the extended position, which is necessary such that the spindle 37 is rotated about the longitudinal axis thereof when the distal ends 31 of the first and second beams 28, 29 are manually articulated about the longitudinal axis of the spindle 37 thereby tightening the primary and secondary straps 55, 59 respectively about the cargo being secured during tightening procedures. The first and second beams 28, 29 are alternatively articulated along a first uni-directional path and a second opposite uni-directional path respectively during tightening and loosening procedures respectively. Such alternating first and second paths respectively allow the user to manually tighten and loosen the primary and secondary straps 55, 59 respectively as needed about the cargo being secured.

The independent winding of the existing strap around the spindle 37 via the handle 40 provides the unexpected benefit of allowing the user to manipulate the winding mechanism 36 without employing the securing mechanism 54 during non-operating conditions. In addition, the ability to move the levers 43, 44 allows the user to wind the entire existing strap around the spindle 37 during non-operating conditions thereby overcoming the prior art shortcomings.

A method 10 of winding an existing strap housed by a multi-functional ratchet 10 includes the steps of providing first 21 and second 22 coextensively shaped rectilinear bars. Each of the bars 21, 22 has left 23 and right 24 axially opposed ends respectively, and each of the bars 21, 22 is provided with a rectilinear channel 25 formed therein. The channels 25 have respective longitudinal lengths that are less than respective longitudinal lengths of the bars 21, 22. The steps further include providing first 28 and second 29 coextensively shaped rectilinear beams. Each of the beams 28, 29 has axially opposed proximal 30 and distal 31 ends respectively, and each of the distal ends 31 of the beams 28, 29 is pivotally attached directly to an associated one of the right ends 24 of the bars 21, 22, without the use of intervening elements. Each of the beams 28, 29 is provided with a rectilinear channel 32 formed therein. The channels 32 have respective longitudinal lengths that are less than respective longitudinal lengths of the beams 28, 29.

The method 10 of winding an existing strap further includes the steps of winding the existing strap about a central portion of the ratchet 10 when the first and second beams 28, 29 are laterally displaced away from equilibrium. The existing strap is freely rotated about the central portion while the first and second beams 28, 29 are maintained at a static position.

The method 10 of winding an existing strap further includes the steps of directly attaching a cylindrical post 26 to respective inner surfaces 27 of each of the left ends 23 of the first and second bars 21, 22, without the use of intervening elements, such that the left ends 23 of the first and second bars 21, 22 are spaced from each other. The post 26 has a longitudinal length registered perpendicular to the longitudinal lengths of the first and second bars 21, 22.

The method 10 of winding an existing strap further includes the steps of directly attaching a cylindrical shaft 33 to respective inner surfaces 34 of each of the proximal ends 30 of the first and second beams 28, 29, without the use of intervening elements, such that the proximal ends 30 of the first and second beams 28, 29 are spaced from each other. The shaft 33 has a longitudinal length registered perpendicular to the longitudinal lengths of the first and second beams 28, 29, and the longitudinal length of the shaft 33 is greater than the longitudinal length of the post 26.

The method 10 of winding the strap about the central portion of the ratchet 10 further includes the steps of connecting a centrally disposed spindle 37 between the right ends 24 of the first and second bars 21, 22 and the distal ends 31 of the first and second beams 28, 29 respectively. The spindle 37 has axially opposed ends 38 simultaneously penetrating through openings 35 of the first and second bars 21, 22 and the first and second beams 28, 29 respectively. The opposed ends 38 of the spindle 37 extend beyond respective outer surfaces 68 of the first and second bars 21, 22 and the first and second beams 28, 29 when the spindle 37 is connected between the right ends 24 of the first and second bars 21, 22 and the distal ends 31 of the first and second beams 28, 29. The spindle 37 has a slot 39 monolithically formed therein and extending along a major longitudinal length thereof such that the spindle 37 is bifurcated into two coextensively shaped halves along the longitudinal length thereof. The slot 39 terminates proximal of the respective opposed ends 38 of the spindle 37. The spindle 37 is freely rotatable about a centrally registered axis thereof during operating conditions while the first and second beams 28, 29 remain stationary.

The method 10 of winding the strap about the central portion of the ratchet 10 further includes the steps of pivotally attaching a distal end 41 of a rectilinear handle 40 directly to a selected one of the opposed ends 38 of the spindle 37, without the use of intervening elements. The handle 40 is located adjacent to the outer surface 68 of the distal end 31 of the first and second beams 28, 29 and further has a proximal end 42 extending away from the distal end 41 of the handle 40 and the selected opposed end 38 during winding procedures. The handle 40 has a longitudinal length registered parallel to the longitudinal lengths of the first and second beams 28, 29 during winding procedures, and the handle 40 and the spindle 37 rotate in sync during winding procedures.

The method 10 of winding the strap about the central portion of the ratchet 10 further includes the steps of slidably interfitting first 43 and second 44 planar levers within the channels 25, 32 and the first and second bars 21, 22 and the first and second beams 28, 29 respectively. The first and second levers 43, 44 extend outwardly and away from the outer surfaces 68 of the first and second bars 21, 22 and the first and second beams 28, 29 respectively. Each of the first and second levers 43, 44 is substantially U-shaped and further has closed proximal ends 45 and open distal ends 46 respectively.

The method 10 of winding the strap about the central portion of the ratchet 10 further includes the steps of providing first 48 and second 49 rectilinear rods. The first rod 48 is provided with axially opposed ends 50 integrally attached to the respective inner surfaces 27 of the first and second bars 21, 22. The first rod 48 has a longitudinal length registered parallel to the post 26, and is spaced from the left ends 23 of the first and second bars 21, 22 and the post 26 respectively. The longitudinal length of the first rod 48 is equal to the longitudinal length of the post 26. The second rod 49 is provided with axially opposed ends 51 integrally attached to the respective inner surfaces 34 of the first and second beams 28, 29, and the second rod 49 has a longitudinal length registered parallel to the shaft 33. The second rod 49 is spaced from the proximal ends 30 of the first and second beams 28, 29 and the shaft 33 respectively, and the longitudinal length of the second rod 49 is equal to the longitudinal length of the shaft 33.

The method 10 of winding the strap about the central portion of the ratchet 10 further includes the steps of providing a plurality of manually adjustable spring-loaded locking pins 52 that have first 53 and second 54 axially opposed ends. Each of the first ends 53 of the locking pins 52 is directly attached to a medial portion of each of the proximal ends 45 of the first and second levers 43, 44 respectively, without the use of intervening elements. Each of the first and second locking pins 52 has a longitudinal length oriented parallel to the longitudinal lengths of the first and second bars 21, 22 and the first and second beams 28, 29 respectively. Each of the second ends 54 of the locking pins 52 is directly attached to a medial portion of the first and second rods 48, 49 respectively, without the use of intervening elements.

The method 10 of winding the strap about the central portion of the ratchet 10 further includes the steps of independently and simultaneously compressing and extending the first and second locking pins 52, along linear paths defined by the longitudinal lengths thereof respectively such that the first and second levers 43, 44 are slidably positioned along respective linear paths defined by the channels 25, 32 of the first and second bars 21, 22 and the first and second beams 28, 29 respectively. The compressed position of the locking pins 52 corresponds to an equilibrium state of the first and second levers 43, 44 respectively while the extended position of the first and second locking pins 52 corresponds to a tensed state respectively.

The method 10 of winding an existing strap further includes the steps of securing cargo within an existing vehicle by providing a primary strap 55 provided with axially opposed first and second ends 57. The primary strap 55 has a lateral width equal to the longitudinal length of the slot 39 of the spindle 37, and the first end of the primary strap 55 is removably penetrated into the slot 39 of the spindle 37 during operating conditions. The first end of the primary strap 55 is wrapped around an outer surface of the spindle 37 and statically affixed thereto. The primary strap 55 has a hook 58 directly attached to the second end 57 thereof, without the use of intervening elements, and the primary strap 55 is wound about the spindle 37 along a major longitudinal length thereof via the handle 40 during securing procedures.

The method 10 of winding an existing strap further includes the steps of providing a secondary strap 59 provided with axially opposed proximal 60 and distal 61 ends. The proximal end 60 of the secondary strap 59 is directly attached to the post 26, without the use of intervening elements, and the secondary strap 59 has a hook 62 directly attached to the distal end 61 thereof, without the use of intervening elements. The secondary strap 59 has a lateral width equal to the lateral width of the primary strap 55. The steps further include directly attaching a plurality of gear wheels 63 to the opposed ends 38 of the spindle 37. Each of the gear wheels 63 is intercalated between the right ends 24 of the bars 21, 22 and the distal ends 31 of the beams 28, 29 respectively, and each of the gear wheels 63 has a saw-tooth pattern of teeth 64 monolithically formed about a circumference thereof.

The method 10 of winding an existing strap further includes the steps of simultaneously and independently engaging selected ones of the teeth 64 of the gear wheels 63 by the open ends 46 of the first and second levers 43, 44 respectively when the respective first and second locking pins 52 are in the extended position such that the spindle 37 is rotated about the longitudinal axis thereof when the distal ends 31 of the first and second beams 28, 29 are manually articulated about the longitudinal axis of the spindle 37 thereby tightening the primary and secondary straps 55, 59 respectively about the cargo being secured during tightening procedures.

The method 10 of winding an existing strap further includes the steps of alternatively articulating the first and second beams 28, 29 along a first uni-directional path and a second opposite uni-directional path respectively during tightening and loosening procedures respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A multi-functional ratchet for assisting a user to quickly and easily wind an existing strap housed by said multi-functional ratchet, said multi-functional ratchet comprising:

first and second coextensively shaped rectilinear bars, each of said bars having left and right axially opposed ends respectively, each of said bars being provided with a rectilinear channel formed therein, said channels having respective longitudinal lengths that are less than respective longitudinal lengths of said bars;

first and second coextensively shaped rectilinear beams, each of said beams having axially opposed proximal and distal ends respectively, each of said distal ends of said beams being pivotally attached directly to an associated one of said right ends of said bars, each of said beams being provided with a rectilinear channel formed therein, said channels having respective longitudinal lengths that are less than respective longitudinal lengths of said beams; and means for winding the existing strap about a central portion of said ratchet when said first and second beams are laterally displaced away from equilibrium;

wherein the existing strap is freely rotated about said central portion while said first and second beams are maintained at a static position.

2. The multi-functional ratchet of claim 1, wherein said right ends of said first and second bars and said distal ends of said first and second beams have openings formed therein respectively, each of said respective openings having equal sized diameters, said openings having a centrally registered axis oriented perpendicularly to respective longitudinal lengths of said first and second bars and said first and second beams.

3. The multi-functional ratchet apparatus of claim 2, wherein a cylindrical post is directly attached to respective inner surfaces of each of said left ends of said first and second bars such that said left ends of said first and second bars are spaced from each other, said post having a longitudinal length registered perpendicular to said longitudinal lengths of said first and second bars.

4. The multi-functional ratchet apparatus of claim 3, wherein a cylindrical shaft is directly attached to respective inner surfaces of each of said proximal ends of said first and second beams such that said proximal ends of said first and second beams are spaced from each other, said shaft having a longitudinal length registered perpendicular to said longitudinal lengths of said first and second beams, said longitudinal length of said shaft being greater than said longitudinal length of said post.

5. The multi-functional ratchet apparatus of claim 4, wherein said winding means comprises:
   a centrally disposed spindle connected between said right ends of said first and second bars and said distal ends of said first and second beams respectively, said spindle having axially opposed ends simultaneously penetrating through said openings of said first and second bars and said first and second beams respectively, said opposed ends of said spindle extending beyond respective outer surfaces of said first and second bars and said first and second beams when said spindle is connected between said right ends of said first and second bars and said distal ends of said first and second beams, said spindle having a slot monolithically formed therein and extending along a major longitudinal length thereof such that said spindle is bifurcated into two coextensively shaped halves along said longitudinal length thereof, said slot terminating proximal of said respective opposed ends of said spindle, said spindle being freely rotatable about a centrally registered axis thereof during operating conditions while said first and second beams remain stationary;
   a rectilinear handle having a distal end pivotally attached directly to a selected one of said opposed ends of said spindle, said handle being located adjacent to said outer surface of said distal end of said first and second beams and further having a proximal end extending away from said distal end of said handle and said selected opposed end during winding procedures, said handle having a longitudinal length registered parallel to said longitudinal lengths of said first and second beams during winding procedures, said handle and said spindle rotating in sync during winding procedures;
   first and second planar levers, each of said first and second levers being substantially U-shaped and further having closed proximal ends and open distal ends respectively, each of said open ends of said first and second levers having laterally opposed outside edges slidably interfitted within said channels of said first and second bars and said first and second beams respectively and further extending outwardly and away from said outer surfaces of said first and second bars and said first and second beams respectively;
   first and second rectilinear rods, said first rod being provided with axially opposed ends integrally attached to said respective inner surfaces of said first and second bars, said first rod having a longitudinal length registered parallel to said post, said first rod being spaced from said left ends of said first and second bars and said post respectively, said longitudinal length of said first rod being equal to said longitudinal length of said post, said second rod being provided with axially opposed ends integrally attached to said respective inner surfaces of said first and second beams, said second rod having a longitudinal length registered parallel to said shaft, said second rod being spaced from said proximal ends of said first and second beams and said shaft respectively, said longitudinal length of said second rod being equal to said longitudinal length of said shaft; and
   a plurality of manually adjustable spring-loaded locking pins provided with first and second axially opposed ends, each of said first ends of said locking pins being directly attached to a medial portion of each of said proximal ends of said first and second levers respectively, each of said first and second locking pins having a longitudinal length oriented parallel to said longitudinal lengths of said first and second bars and said first and second beams respectively, each of said second ends of said locking pins being directly attached to a medial portion of said first and second rods respectively;
   wherein said first and second locking pins are independently and simultaneously compressed and extended along linear paths defined by said longitudinal lengths thereof respectively such that said first and second levers are slidably positioned along respective linear paths defined by said channels of said first and second bars and said first and second beams respectively;
   wherein said compressed position of said locking pins corresponds to an equilibrium state of said first and second levers respectively while said extended position of said first and second locking pins corresponds to a tensed state respectively.

6. The multi-functional ratchet apparatus of claim 5, further comprising: means for securing cargo within an existing vehicle, said securing means including
   a primary strap provided with axially opposed first and second ends, said primary strap having a lateral width equal to said longitudinal length of said slot of said spindle, said first end of said primary strap being removably penetrated into said slot of said spindle during operating conditions, said first end of said primary strap being wrapped around an outer surface of said spindle and statically affixed thereto, said primary strap having a hook directly attached to said second end thereof, said primary strap being wound about said spindle along a major longitudinal length thereof via said handle during securing procedures;
   a secondary strap provided with axially opposed proximal and distal ends, said proximal end of said secondary strap being directly attached to said post, said secondary strap having a hook directly attached to said distal end thereof, said secondary strap having a lateral width equal to said lateral width of said primary strap; and
   a plurality of gear wheels directly attached to said opposed ends of said spindle, each of said gear wheels being intercalated between said right ends of said bars and said distal ends of said beams respectively, each of said gear wheels having a saw-tooth pattern of teeth monolithically formed about a circumference thereof;
   wherein selected ones of said teeth of said gear wheels are simultaneously and independently engaged by said open ends of said first and second levers respectively when said respective first and second locking pins are in the extended position such that said spindle is rotated about said longitudinal axis thereof when said distal ends of said first and second beams are manually articulated about said longitudinal axis of said spindle thereby tightening said primary and secondary straps respectively about the cargo being secured during tightening procedures;

wherein said first and second beams are alternatively articulated along a first uni-directional path and a second opposite uni-directional path respectively during tightening and loosening procedures respectively.

7. A multi-functional ratchet for assisting a user to quickly and easily wind an existing strap housed by said multi-functional ratchet, said multi-functional ratchet comprising:

first and second coextensively shaped rectilinear bars, each of said bars having left and right axially opposed ends respectively, each of said bars being provided with a rectilinear channel formed therein, said channels having respective longitudinal lengths that are less than respective longitudinal lengths of said bars;

first and second coextensively shaped rectilinear beams, each of said beams having axially opposed proximal and distal ends respectively, each of said distal ends of said beams being pivotally attached directly to an associated one of said right ends of said bars, each of said beams being provided with a rectilinear channel formed therein, said channels having respective longitudinal lengths that are less than respective longitudinal lengths of said beams; and means for winding the existing strap about a central portion of said ratchet when said first and second beams are laterally displaced away from equilibrium, said winding means being rotatably connected to said right ends of said first and second bars and said distal ends of said first and second beams respectively;

wherein the existing strap is freely rotated about said central portion while said first and second beams are maintained at a static position.

8. The multi-functional ratchet of claim 7, wherein said right ends of said first and second bars and said distal ends of said first and second beams have openings formed therein respectively, each of said respective openings having equal sized diameters, said openings having a centrally registered axis oriented perpendicularly to respective longitudinal lengths of said first and second bars and said first and second beams.

9. The multi-functional ratchet apparatus of claim 8, wherein a cylindrical post is directly attached to respective inner surfaces of each of said left ends of said first and second bars such that said left ends of said first and second bars are spaced from each other, said post having a longitudinal length registered perpendicular to said longitudinal lengths of said first and second bars.

10. The multi-functional ratchet apparatus of claim 9, wherein a cylindrical shaft is directly attached to respective inner surfaces of each of said proximal ends of said first and second beams such that said proximal ends of said first and second beams are spaced from each other, said shaft having a longitudinal length registered perpendicular to said longitudinal lengths of said first and second beams, said longitudinal length of said shaft being greater than said longitudinal length of said post.

11. The multi-functional ratchet apparatus of claim 10, wherein said winding means comprises:

a centrally disposed spindle connected between said right ends of said first and second bars and said distal ends of said first and second beams respectively, said spindle having axially opposed ends simultaneously penetrating through said openings of said first and second bars and said first and second beams respectively, said opposed ends of said spindle extending beyond respective outer surfaces of said first and second bars and said first and second beams when said spindle is connected between said right ends of said first and second bars and said distal ends of said first and second beams, said spindle having a slot monolithically formed therein and extending along a major longitudinal length thereof such that said spindle is bifurcated into two coextensively shaped halves along said longitudinal length thereof, said slot terminating proximal of said respective opposed ends of said spindle, said spindle being freely rotatable about a centrally registered axis thereof during operating conditions while said first and second beams remain stationary;

a rectilinear handle having a distal end pivotally attached directly to a selected one of said opposed ends of said spindle, said handle being located adjacent to said outer surface of said distal end of said first and second beams and further having a proximal end extending away from said distal end of said handle and said selected opposed end during winding procedures, said handle having a longitudinal length registered parallel to said longitudinal lengths of said first and second beams during winding procedures, said handle and said spindle rotating in sync during winding procedures;

first and second planar levers, each of said first and second levers being substantially U-shaped and further having closed proximal ends and open distal ends respectively, each of said open ends of said first and second levers having laterally opposed outside edges slidably interfitted within said channels of said first and second bars and said first and second beams respectively and further extending outwardly and away from said outer surfaces of said first and second bars and said first and second beams respectively;

first and second rectilinear rods, said first rod being provided with axially opposed ends integrally attached to said respective inner surfaces of said first and second bars, said first rod having a longitudinal length registered parallel to said post, said first rod being spaced from said left ends of said first and second bars and said post respectively, said longitudinal length of said first rod being equal to said longitudinal length of said post, said second rod being provided with axially opposed ends integrally attached to said respective inner surfaces of said first and second beams, said second rod having a longitudinal length registered parallel to said shaft, said second rod being spaced from said proximal ends of said first and second beams and said shaft respectively, said longitudinal length of said second rod being equal to said longitudinal length of said shaft; and a plurality of manually adjustable spring-loaded locking pins provided with first and second axially opposed ends, each of said first ends of said locking pins being directly attached to a medial portion of each of said proximal ends of said first and second levers respectively, each of said first and second locking pins having a longitudinal length oriented parallel to said longitudinal lengths of said first and second bars and said first and second beams respectively, each of said second ends of said locking pins being directly attached to a medial portion of said first and second rods respectively;

wherein said first and second locking pins are independently and simultaneously compressed and extended along linear paths defined by said longitudinal lengths thereof respectively such that said first and second levers are slidably positioned along respective linear paths defined by said channels of said first and second bars and said first and second beams respectively;

wherein said compressed position of said locking pins corresponds to an equilibrium state of said first and second levers respectively while said extended position of said first and second locking pins corresponds to a tensed state respectively.

12. The multi-functional ratchet apparatus of claim 11, further comprising: means for securing cargo within an existing vehicle, said securing means including
   a primary strap provided with axially opposed first and second ends, said primary strap having a lateral width equal to said longitudinal length of said slot of said spindle, said first end of said primary strap being removably penetrated into said slot of said spindle during operating conditions, said first end of said primary strap being wrapped around an outer surface of said spindle and statically affixed thereto, said primary strap having a hook directly attached to said second end thereof, said primary strap being wound about said spindle along a major longitudinal length thereof via said handle during securing procedures;
   a secondary strap provided with axially opposed proximal and distal ends, said proximal end of said secondary strap being directly attached to said post, said secondary strap having a hook directly attached to said distal end thereof, said secondary strap having a lateral width equal to said lateral width of said primary strap; and
   a plurality of gear wheels directly attached to said opposed ends of said spindle, each of said gear wheels being intercalated between said right ends of said bars and said distal ends of said beams respectively, each of said gear wheels having a saw-tooth pattern of teeth monolithically formed about a circumference thereof;
   wherein selected ones of said teeth of said gear wheels are simultaneously and independently engaged by said open ends of said first and second levers respectively when said respective first and second locking pins are in the extended position such that said spindle is rotated about said longitudinal axis thereof when said distal ends of said first and second beams are manually articulated about said longitudinal axis of said spindle thereby tightening said primary and secondary straps respectively about the cargo being secured during tightening procedures;
   wherein said first and second beams are alternatively articulated along a first uni-directional path and a second opposite uni-directional path respectively during tightening and loosening procedures respectively.

13. A method for winding an existing strap housed by a multi-functional ratchet, said method comprising the steps of:
   a. providing first and second pairs of coextensively shaped rectilinear bars, each of said bars having left and right axially opposed ends respectively, each of said bars being provided with a rectilinear channel formed therein, said channels having respective longitudinal lengths that are less than respective longitudinal lengths of said bars;
   b. providing first and second coextensively shaped rectilinear beams, each of said beams having axially opposed proximal and distal ends respectively, each of said distal ends of said beams being pivotally attached directly to an associated one of said right ends of said bars, each of said beams being provided with a rectilinear channel formed therein, said channels having respective longitudinal lengths that are less than respective longitudinal lengths of said beams; and
   c. winding the existing strap about a central portion of said ratchet when said first and second beams are laterally displaced away from equilibrium;
   wherein the existing strap is freely rotated about said central portion while said first and second beams are maintained at a static position.

14. The method of claim 13, wherein said right ends of said first and second bars and said distal ends of said first and second beams have openings formed therein respectively, each of said respective openings having equal sized diameters, said openings having a centrally registered axis oriented perpendicularly to respective longitudinal lengths of said first and second bars and said first and second beams.

15. The method of claim 14, further comprising the steps of:
   d. directly attaching a cylindrical post to respective inner surfaces of each of said left ends of said first and second bars such that said left ends of said first and second bars are spaced from each other, said post having a longitudinal length registered perpendicular to said longitudinal lengths of said first and second bars.

16. The method of claim 15, further comprising the steps of:
   e. directly attaching a cylindrical shaft to respective inner surfaces of each of said proximal ends of said first and second beams such that said proximal ends of said first and second beams are spaced from each other, said shaft having a longitudinal length registered perpendicular to said longitudinal lengths of said first and second beams, said longitudinal length of said shaft being greater than said longitudinal length of said post.

17. The method of claim 16, wherein step c. comprises the steps of:
   i. connecting a centrally disposed spindle between said right ends of said first and second bars and said distal ends of said first and second beams respectively, said spindle having axially opposed ends simultaneously penetrating through said openings of said first and second bars and said first and second beams respectively, said opposed ends of said spindle extending beyond respective outer surfaces of said first and second bars and said first and second beams when said spindle is connected between said right ends of said first and second bars and said distal ends of said first and second beams, said spindle having a slot monolithically formed therein and extending along a major longitudinal length thereof such that said spindle is bifurcated into two coextensively shaped halves along said longitudinal length thereof, said slot terminating proximal of said respective opposed ends of said spindle, said spindle being freely rotatable about a centrally registered axis thereof during operating conditions while said first and second beams remain stationary;
   ii. pivotally attaching a distal end of a rectilinear handle directly to a selected one of said opposed ends of said spindle, said handle being located adjacent to said outer surface of said distal end of said first and second beams and further having a proximal end extending away from said distal end of said handle and said selected opposed end during winding procedures, said handle having a longitudinal length registered parallel to said longitudinal lengths of said first and second beams during winding procedures, said handle and said spindle rotating in sync during winding procedures;

iii. slidably interfitting first and second planar levers within said channels and said first and second beams respectively and further extending outwardly and away from said outer surfaces of said first and second bars and said first and second beams respectively, each of said first and second levers being substantially U-shaped and further having closed proximal ends and open distal ends respectively;

iv. providing first and second rectilinear rods, said first rod being provided with axially opposed ends integrally attached to said respective inner surfaces of said first and second bars, said first rod having a longitudinal length registered parallel to said post, said first rod being spaced from said left ends of said first and second bars and said post respectively, said longitudinal length of said first rod being equal to said longitudinal length of said post, said second rod being provided with axially opposed ends integrally attached to said respective inner surfaces of said first and second beams, said second rod having a longitudinal length registered parallel to said shaft, said second rod being spaced from said proximal ends of said first and second beams and said shaft respectively, said longitudinal length of said second rod being equal to said longitudinal length of said shaft;

v. providing a plurality of manually adjustable spring-loaded locking pins having first and second axially opposed ends, each of said first ends of said locking pins being directly attached to a medial portion of each of said proximal ends of said first and second levers respectively, each of said first and second locking pins having a longitudinal length oriented parallel to said longitudinal lengths of said first and second bars and said first and second beams respectively, each of said second ends of said locking pins being directly attached to a medial portion of said first and second rods respectively; and vi. independently and simultaneously compressing and extending said first and second locking pins along linear paths defined by said longitudinal lengths thereof respectively such that said first and second levers are slidably positioned along respective linear paths defined by said channels of said first and second bars and said first and second beams respectively;

wherein said compressed position of said locking pins corresponds to an equilibrium state of said first and second levers respectively while said extended position of said first and second locking pins corresponds to a tensed state respectively.

18. The method of claim 17, further comprising the steps of:

f. securing cargo within an existing vehicle by providing a primary strap provided with axially opposed first and second ends, said primary strap having a lateral width equal to said longitudinal length of said slot of said spindle, said first end of said primary strap being removably penetrated into said slot of said spindle during operating conditions, said first end of said primary strap being wrapped around an outer surface of said spindle and statically affixed thereto, said primary strap having a hook directly attached to said second end thereof, said primary strap being wound about said spindle along a major longitudinal length thereof via said handle during securing procedures;

g. providing a secondary strap provided with axially opposed proximal and distal ends, said proximal end of said secondary strap being directly attached to said post, said secondary strap having a hook directly attached to said distal end thereof, said secondary strap having a lateral width equal to said lateral width of said primary strap;

h. directly attaching a plurality of gear wheels to said opposed ends of said spindle, each of said gear wheels being intercalated between said right ends of said bars and said distal ends of said beams respectively, each of said gear wheels having a saw-tooth pattern of teeth monolithically formed about a circumference thereof;

i. simultaneously and independently engaging selected ones of said teeth of said gear wheels by said open ends of said first and second levers respectively when said respective first and second locking pins are in the extended position such that said spindle is rotated about said longitudinal axis thereof when said distal ends of said first and second beams are manually articulated about said longitudinal axis of said spindle thereby tightening said primary and secondary straps respectively about the cargo being secured during tightening procedures; and j. alternatively articulating said first and second beams along a first uni-directional path and a second opposite uni-directional path respectively during tightening and loosening procedures respectively.

\* \* \* \* \*